(12) United States Patent
Ocher et al.

(10) Patent No.: US 11,562,245 B2
(45) Date of Patent: Jan. 24, 2023

(54) NEURAL NETWORK MODEL GENERATION AND DISTRIBUTION WITH CLIENT FEEDBACK

(71) Applicant: SAP SE, Walldorf (DE)

(72) Inventors: Alexander Ocher, San Jose, CA (US); Viktor Lapitski, Mountain View, CA (US); Andrey Belyy, Sunnyvale, CA (US)

(73) Assignee: SAP SE, Walldorf (DE)

( * ) Notice: Subject to any disclaimer, the term of this patent is extended or adjusted under 35 U.S.C. 154(b) by 698 days.

(21) Appl. No.: 16/586,035

(22) Filed: Sep. 27, 2019

(65) Prior Publication Data
US 2021/0097395 A1    Apr. 1, 2021

(51) Int. Cl.
*G06N 3/08*    (2006.01)
*G06K 9/62*    (2022.01)
*G06N 3/10*    (2006.01)

(52) U.S. Cl.
CPC .......... *G06N 3/082* (2013.01); *G06K 9/6256* (2013.01); *G06N 3/10* (2013.01)

(58) Field of Classification Search
CPC ......... G06N 3/082; G06N 3/10; G06K 9/6256
See application file for complete search history.

(56) References Cited

U.S. PATENT DOCUMENTS

| | | | |
|---|---|---|---|
| 8,250,009 B1 | 8/2012 | Breckenridge et al. | |
| 9,324,022 B2 * | 4/2016 | Williams, Jr. | ....... G06N 3/0454 |
| 9,336,494 B1 | 5/2016 | Purpura et al. | |
| 9,449,344 B2 | 9/2016 | Deshpande et al. | |
| 10,163,061 B2 | 12/2018 | Grove et al. | |
| 2015/0324690 A1 | 11/2015 | Chilimbi et al. | |
| 2016/0350671 A1 | 12/2016 | Morris, II et al. | |
| 2017/0323216 A1 | 11/2017 | Fano | |
| 2019/0102670 A1 * | 4/2019 | Ceulemans | .............. G06N 3/04 |

OTHER PUBLICATIONS

Hamm, Jihun, Jackson Luken, and Yani Xie. "Crowd-ML: A library for privacy-preserving machine learning on smart devices." 2017 IEEE International Conference on Acoustics, Speech and Signal Processing (ICASSP). IEEE, 2017. (Year: 2017).*

(Continued)

*Primary Examiner* — Eric Nilsson
(74) *Attorney, Agent, or Firm* — Klarquist Sparkman, LLP

(57) ABSTRACT

Technologies described herein can be used to generate and distribute neural network models and executable code using feedback data received from one or more client computing devices. A neural network model can be generated by a server computer. Executable code can also be generated by the server that, when executed by a client computing device, causes the client device to generate a prediction using the neural network model. The server can transmit the model and code to one or more client computing devices. The server can receive feedback data from the client device(s) based on predictions generated by the client device(s) using the neural network model and the executable code. The server can generate an updated version of the neural network model and/or an updated version of the executable code base on the feedback data, and can transmit the updated model and/or the updated code to the client device(s).

20 Claims, 8 Drawing Sheets

(56) References Cited

OTHER PUBLICATIONS

Algorithmia, "Machine Learning and Mobile: Deploying Models on The Edge," Algorithmia Blog, Jun. 21, 2018, 7 pages.
"Machine Learning on Mobile: On The Device or in The Cloud?," https://machinethink.net/blog/machine-learning-device-or-cloud/, May 28, 2019, 17 pages.
"Retrain and Deploy a Machine Learning Model," Azure Machine Learning Studio, Microsoft Docs, https://docs.microsoft.com/en-us/azure/machine-learning/studio/retrain-machine-learning-model, Feb. 14, 2019, 8 pages.

* cited by examiner

NEURAL NETWORK MODEL GENERATION AND DISTRIBUTION WITH CLIENT FEEDBACK

BACKGROUND

In many applications that use neural networks, the neural network is deployed as part of the application in a static form. In at least some cases, the neural network undergoes an initial training as part of application development. In at least some such applications, the application includes instructions that continue to train the neural network at a client. In some other applications, a neural network is trained and hosted at a centralized server. A client that wishes to use such a neural network sends requests to the server and the server generates predictions using the neural network and sends the results to the client. In the scenario where the neural network is part of an application executed by a client, the client cannot benefit from ongoing training based on usage by other clients. However, in the scenario where the neural network is hosted on a server, the client is subject to latency since access to the neural network is restricted to the server. Additionally, the neural network may not be trained in a way that is particular to the needs of a given client.

Therefore, there is room for improvement in technologies related to the generation and distribution of neural networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises generating a neural network model by one or more server computers; generating, by the one or more server computers, executable code to access the neural network model, wherein the generated executable code can be executed by a client computing device; transmitting the neural network model and the executable code to the client computing device; receiving, by the one or more server computers, feedback data from the client computing device, wherein the feedback data is generated by the client computing device based on results produced using the neural network model and the executable code; generating, by the one or more server computers, an updated neural network model and updated executable code to access the updated neural network model based on the received feedback data; and transmitting the updated neural network model and the updated executable code to the client computing device.

In another example embodiment, a system comprises a server computer that comprises a processor and a memory storing instructions that, when executed by the processor, configure the server computer to perform operations, wherein the operations comprise: generating a neural network model; generating executable code that, when executed by a client computing device, causes the client computing device to generate a prediction using the neural network model; transmitting the neural network model and the executable code to the client computing device; receiving feedback data from the client computing device, wherein the feedback data comprises an indication of an accuracy of the prediction generated by the client computing device using the neural network model; generating an updated neural network model and updated executable code using the received feedback data; and transmitting the updated neural network model and the updated executable code to the client computing device.

In another example embodiment, a computing device comprises a processor and a memory storing instructions that, when executed by the processor, configure the computing device to perform operations, wherein the operations comprise: receiving a neural network model and executable code from a server computer; executing the executable code to generate a prediction using the neural network model; generating feedback data based on an accuracy of the generated prediction; transmitting the feedback data to the server computer; receiving an updated neural network model based on the feedback data and updated executable code from the server computer; and executing the updated executable code to generate an updated prediction using the updated neural network model.

As described herein, a variety of other features and advantages can be incorporated into the technologies as desired.

DETAILED DESCRIPTION

EXAMPLE 1

Overview

Figure 1A:
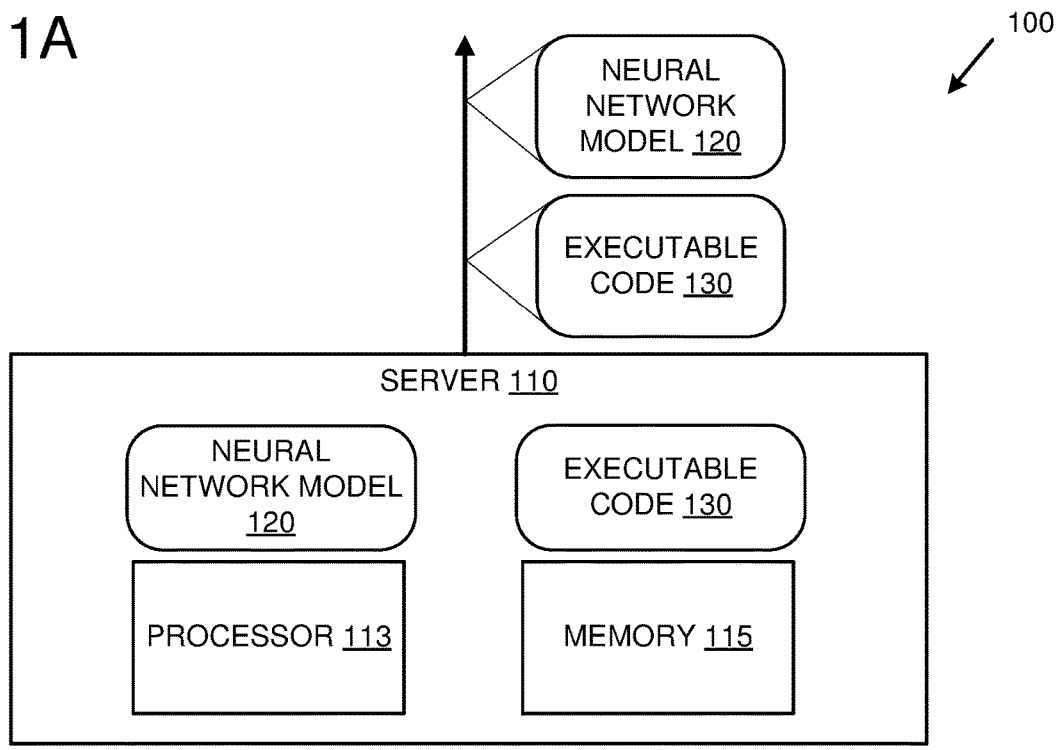
FIGS. 1A-B are a system diagrams depicting an example system comprising a server configured for neural network model and code generation and distribution.

The description provided herein is directed to various technologies for generating and distributing neural network models with client-generated feedback.

In scenarios where a neural network is part of an application executed by a client, the client usually cannot benefit from ongoing training based on usage by other clients. Thus, learning operations may be limited because feedback is not shared across clients. Furthermore, the client computers performing predictions with the neural network must be computationally powerful enough to perform training operations, which can be computationally expensive. Because of this, at least some low-power computing devices (such as embedded devices and/or Internet of Things (IoT) devices) are unable to leverage neural network-based artificial intelligence applications. However, in scenarios where the neural network is hosted on a server, the client can be subject to latency since access to the neural network is restricted to the server and the client must wait for the server to respond with a prediction. Additionally, in such scenarios the neural network may not be trained in a way that is particular to the needs of a given client.

Various technologies described herein can be used to address these problems by generating a neural network model, and executable code to operate the neural network model, at a server computer and transmitting the model and code to one or more client computing devices. The executable code can be used by the one or more client computing devices to perform predictions using the neural network model. The results of the predictions (for example, indicating whether a given prediction generated for a given set of inputs is accurate) are transmitted by the one or more client computing devices to the server computer. The server computer can use the feedback data to generate an updated version of the neural network model and/or an updated version of the executable code. The updated neural network model and/or updated code can then be transmitted to the one or more client computing devices for subsequent processing.

In a different or further example, a server installed in a cloud environment (such as SAP Cloud Platform (Data Hub as a Service, DHaaS)), receives data to generate and train a neural network model. For example, the data can comprise initial training data set(s), validation data set(s), and/or test data set(s) for initial model training. Additionally or alternatively, the data can include feedback data collected from one or more client computing devices. The server can use one or more neural network training techniques to train the neural network model. The server can send the trained model to a client computing device along with executable code (such as code for a data processing job) that uses the neural network model to make one or more predictions (such as labeling or the like). The results of processing the executable code by the client computing device can be analyzed and it can be determined whether the prediction(s) is/are correct. In a particular example, it can be determined whether a given email was (in)correctly labeled as spam by the client computing device using the neural network model. The input data and the corresponding prediction(s) can be sent back to the server as feedback data. In at least some embodiments, feedback data is stored in a database in the cloud environment. The server can be configured to re-run the training process using the received feedback data to improve and refine the neural network model. The updated neural network model can be sent to the client computing device(s), along with updated executable code for using the updated neural network model.

By performing the neural network model generation and training operations at a centralized server, many computationally expensive operations can be off-loaded from the client computing device to the centralized server. Thus, less powerful (and therefore less expensive) processors can be used in the client computing devices without sacrificing functionality. Furthermore, hosting the neural network model at the client improves latency and responsiveness of the client. Furthermore, in embodiments with multiple client computing devices, training can leverage feedback collected across multiple clients. Moreover, by generating the executable code for using the neural network model, and transmitting it to the client(s) with the neural network model, the server can ensure consistent application of the neural network model as it is updated.

Example applications of at least some of the technologies described herein include email fraud detection, sentiment classification and analysis, image recognition, gesture recognition, computer visualization, natural language processing, etc.

EXAMPLE 2

Example Systems and Methods for Neural Network Model Generation Using Client Feedback In any of the examples described herein, systems and methods can be provided for generating and distributing neural network models and supporting executable code.

Figure 1B:
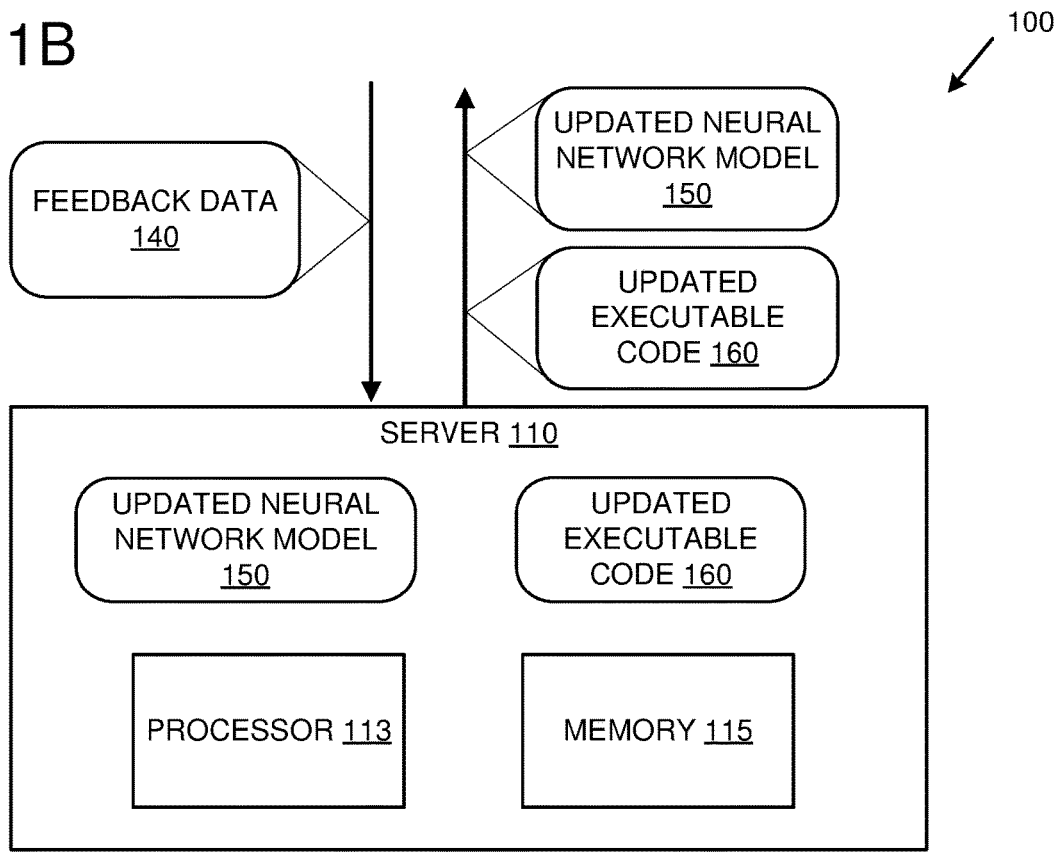

FIGS. 1A-B are system diagrams depicting an example system 100 for neural network model and code generation and distribution. FIG. 1A depicts the example system 100 comprising a server 110 that comprises a processor 113 and a memory 115. The memory 115 can store instructions (not shown) that, when executed by the processor 113, configure the server computer 110 to perform operations for generating and distributing neural network models and supporting executable code.

The server 110 is configured to generate a neural network model 120. As described in more detail below, a neural network model can comprise a plurality of artificial neurons and connecting edges (optionally with associated weights) that are organized in a directed graph. The server 110 is further configured to generate executable code 130 that, when executed by a client computing device (not shown), causes the client computing device to generate one or more predictions using the neural network model 120. In at least some embodiments, the example system 100 comprises a cloud computing environment (not shown) that comprises the server computer 110.

The server computer 110 is configured to transmit the neural network model 120 and the executable code 130 to one or more client computing devices. Although the neural network model 120 and the executable code 130 are depicted in FIG. 1A at separate transmissions, in some embodiments the neural network model 120 and the executable code 130 can be transmitted as part of a single transmission. Additionally or alternatively, the neural network model 120 and/or the executable code 130 can be broken up and transmitted in a plurality of transmissions. The neural network model 120 and the executable code 130 can be transmitted via one or more wired and/or wireless connections. In at least some embodiments, the neural network model 120 and the executable code 130 are transmitted to one or more client computing devices via a computer network.

In at least some embodiments, the server computer 110 can be configured to determine a device type of a given client computing device and to generate executable code that can be executed by a device of the given device type. For example, the server computer 110 can determine that a given client computing device is an embedded computing device that comprises an integrated circuit. The server computer 110 can be configured to generate executable code 130 that comprises instructions that can be executed by the integrated circuit to generate a prediction using the neural network model 120.

The server computer 110 can be configured to transmit the neural network model 120 to the one or more client computing devices in a read-only mode. For example, transmitting the neural network model 120 in a read-only mode can comprise transmitting the neural network model 120 with one or more checksums (e.g., one or more values generated by creating one or more hashes of the neural network model 120). The executable code 130 can comprise instructions that create one or more checksums (for example, by hashing one or more parts of the neural network model 120), and compare the one or more generated checksums with the one or more received checksums prior to performing a prediction using the neural network model 120. Additionally or alternatively, the executable code 130 can omit instructions for modifying the neural network model 120. Additionally or alternatively, the neural network model 120 can be transmitted to the one or more client computing devices in an encrypted format. In such an embodiment, the executable code 130 can comprise instructions for decrypting the neural network model 120.

The server computer 110 can be configured to generate an updated neural network model and updated executable code based on feedback data received from one or more client computing devices. For example, in FIG. 1B the server computer 110 is depicted as receiving the feedback data 140 from a client computing device. The feedback data can comprise an indication of an accuracy of a prediction generated by the client computing device using the neural network model 120. For example, the feedback data can comprise a prediction made using the neural network model 120, input that was provided to the neural network model 120 when making the prediction, and one or more values indicating whether or not the prediction was correct.

The server computer 110 is configured to generate an updated neural network model 150 and updated executable code 160 using the feedback data 140. For example, the server computer 110 can be configured to use the feedback data 140 to train the neural network model 120 (for example, by adjusting one or more activation thresholds of one or more neurons of the neural network model 120, adjusting one or more weights associated with the edges of the neural network model 120, and/or adding and/or removing neurons from the neural network model 120) in order to produce the updated neural network model 150. The updated executable code 160 can comprise instructions that, when executed by a client computing device, cause the client computing device to generate one or more predictions using the updated neural network model 150.

The server computer 110 can be configured to transmit the updated neural network model 150 and the updated executable code 160 to one or more client computing devices. In at least some embodiments, the updated neural network model 150 and the updated executable code 160 are transmitted to the client computing device from which the feedback data 140 was received. Additionally or alternatively, the updated neural network model 150 and the updated executable code 160 can be transmitted to a plurality of client computing devices. In at least some embodiments, feedback data is received from multiple client computing devices and used to generate the updated neural network model 150 and the updated executable code 160. Additionally or alternatively, the server computer 110 can be configured to periodically generate updated versions of the neural network model and the executable code based on feedback data received from one or more client computing devices.

Figure 2:
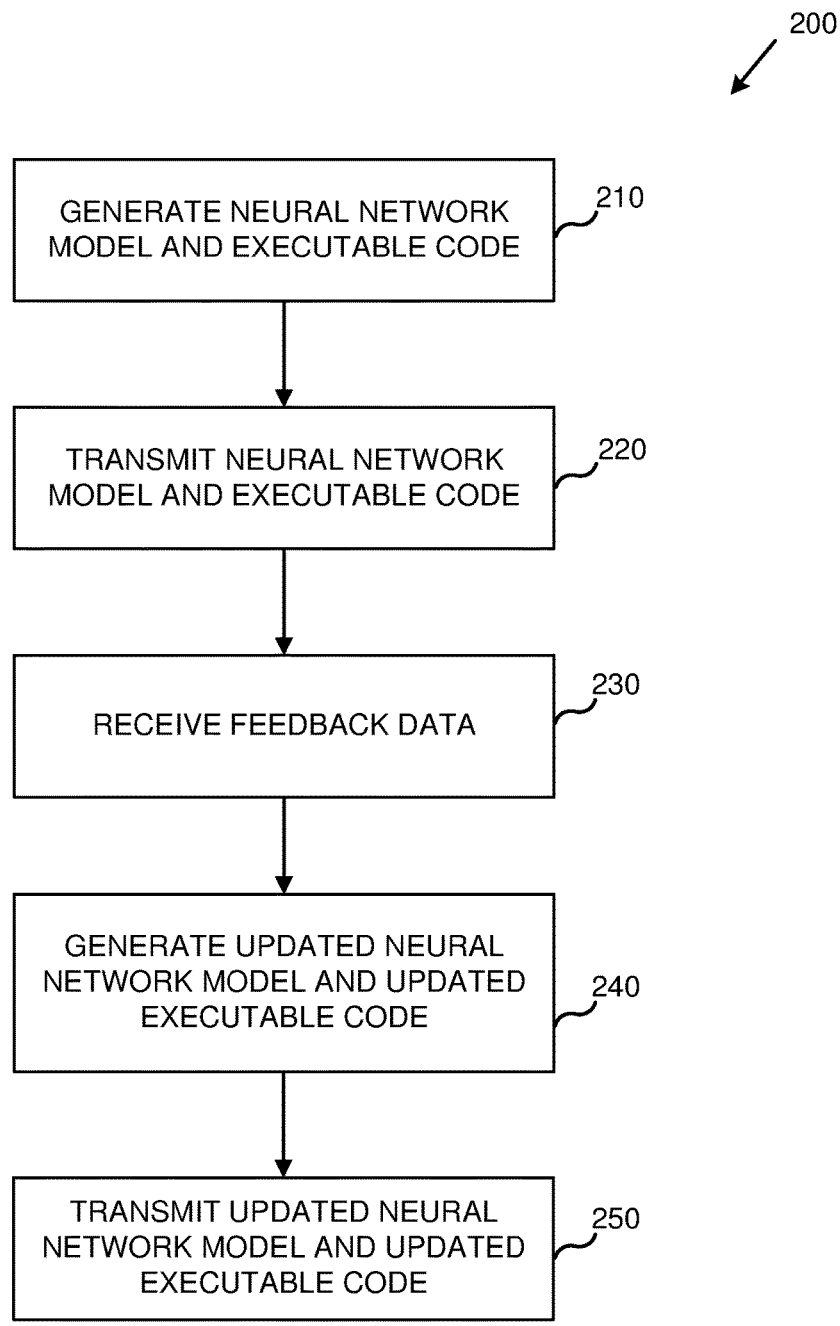
FIG. 2 is a flowchart of an example method for neural network model and code generation and distribution.

FIG. 2 is a flowchart of an example method 200 for neural network model and code generation and distribution. Any of the example systems described herein can be used to perform the example method 200. For example, the example system 100 depicted in FIGS. 1A-B can be used to perform the example method 200. Additionally or alternatively, the example method 200 can be performed by a plurality of server computers.

At 210, a neural network model and executable code to access the neural network model are generated. For example, referring to FIG. 1A, the example server 110 can be configured to generate the neural network model 120 and the executable code 130. The generated code can be executed by a client computing device to access the generated neural network model.

In at least some embodiments, generating the neural network model comprises training a neural network model based on an initial training data set. Such a training data set can be stored in a database or other data store. In at least some embodiments, a given client computing device can be associated with a client identifier and the neural network model can be generated using training data retrieved from a database associated with the client identifier.

At 220, the neural network model and the executable code are transmitted to the client computing device. For example, referring to FIG. 1, the server computer 110 can transmit the neural network model 120 and the executable code 130 to a client computing device.

The neural network model and the executable code can be transmitted to the client computing device via one or more wired and/or wireless connections and/or via a computer network. In at least some embodiments, transmitting the neural network model and the executable code to the client computing device can comprise transmitting a read-only neural network model. For example, a read-only neural network model can be transmitted by omitting instructions from the executable code to update the neural network model. Additionally or alternatively, the neural network model can be transmitted with one or more checksums that can be evaluated by the executable code before using the neural network model to generate a prediction at the client computing device. For example, the executable code can comprise instructions that cause the client computing device to generate one or more checksums based on the neural network model and then compare those checksums to the one or more checksums received with the neural network model. Any changes made to the neural network model on the client computing device will cause the comparison to fail. If the comparison fails, the neural network model is not used to generate a prediction. In at least some such embodiments, the executable code can include instructions that cause the client computing device to request that the neural network model and the executable code be retransmitted in the event that the checksum comparison fails.

At 230, feedback data is received from the client computing device. For example, referring to FIG. 1B, the server computer 110 can receive the feedback data 140 from the client computing device.

The feedback data can be generated by the client computing device based on results produced using the neural network model and the executable code that were transmitted to the client computing device at 220. The feedback data can comprise one or more predictions made by the client computing device, one or more associated input values, and one or more values indicating whether or not the one or more predictions were correct.

In at least some embodiments, the feedback data can be stored in a database or other data store. In an embodiment where the client computing device is associated with a client identifier, the feedback data can be stored in a database associated with the client identifier.

At 240, an updated neural network model and updated executable code are generated based on the received feedback data. For example, referring to FIG. 1B, the server 110 can generate the updated neural network model 150 and the updated executable code 160 based on the feedback data 140. The updated executable code can contain instructions to access the updated neural network model when executed by the client computing device. Generating the updated neural network model can comprise training and/or rebuilding the neural network model generated at 210 using the feedback data.

At 250, the updated neural network model and the updated executable code are transmitted to the client computing device. For example, referring to FIG. 1B, the server computer 110 can transmit the updated neural network model 150 and the updated executable code 160 to the client computing device. The neural network model and the updated executable code can be transmitted to the client computing device via one or more wired or wireless connections and/or via a computer network. In at least some embodiments, the updated neural network model can be transmitted to the client computing device in a read-only mode.

In at least some embodiments, the neural network model and the executable code can be transmitted to multiple client computing devices at 220. In such an embodiment, feedback data can be received at 230 from the multiple client computing devices and generating the updated neural network model at 240 can comprise updating the neural network model using the separate feedback data from the multiple client computing devices. The updated neural network model and the updated executable code can be transmitted to the multiple computing devices at 250.

In at least some embodiments comprising multiple client computing devices, generating the executable code and/or generating the updated executable code can comprise generating different versions of executable code for at least two of the multiple client computing devices. For example, different data stores associated with the at least two of the multiple client computing devices can be identified. Different executable instructions to access the different data stores while using the neural network model can be generated and the different executable instructions can be transmitted to the at least two of the multiple client computing devices.

EXAMPLE 3

Example Client Computing Device

In any of the examples described herein, a client computing device can be provided for generating predictions using neural network models and generating feedback data.

Figure 3A:
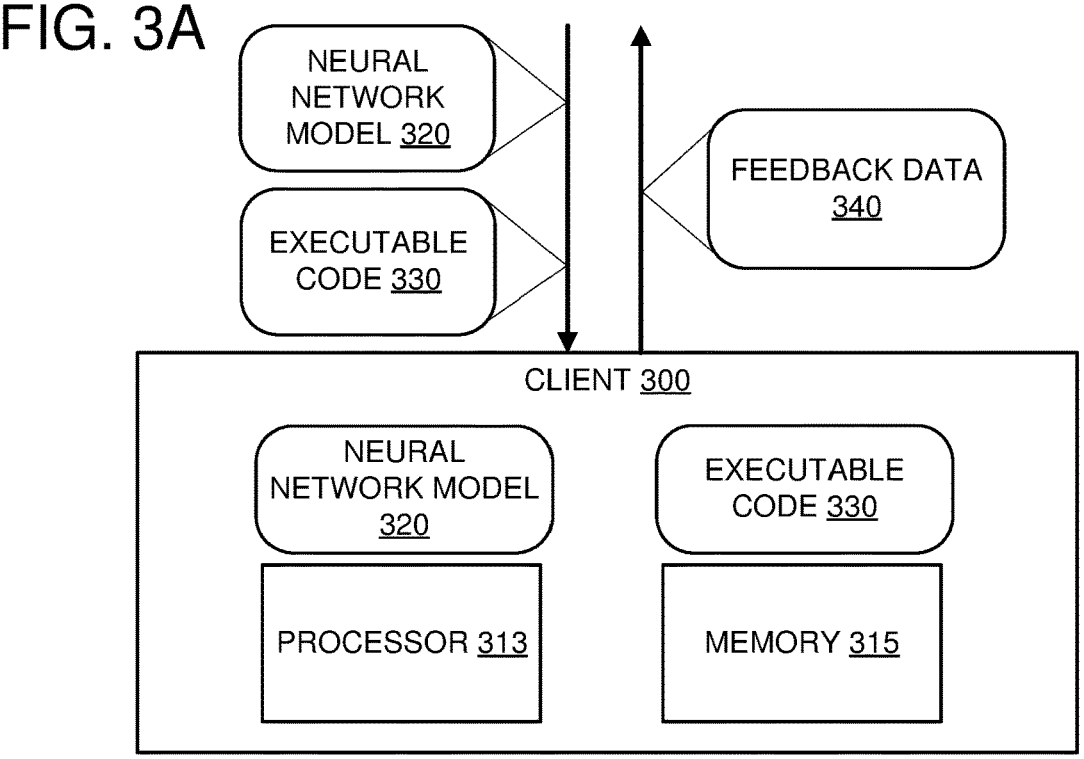
FIGS. 3A-B are diagrams depicting an example client computing device configured to receive a neural network model and code and generate feedback data.
Figure 3B:
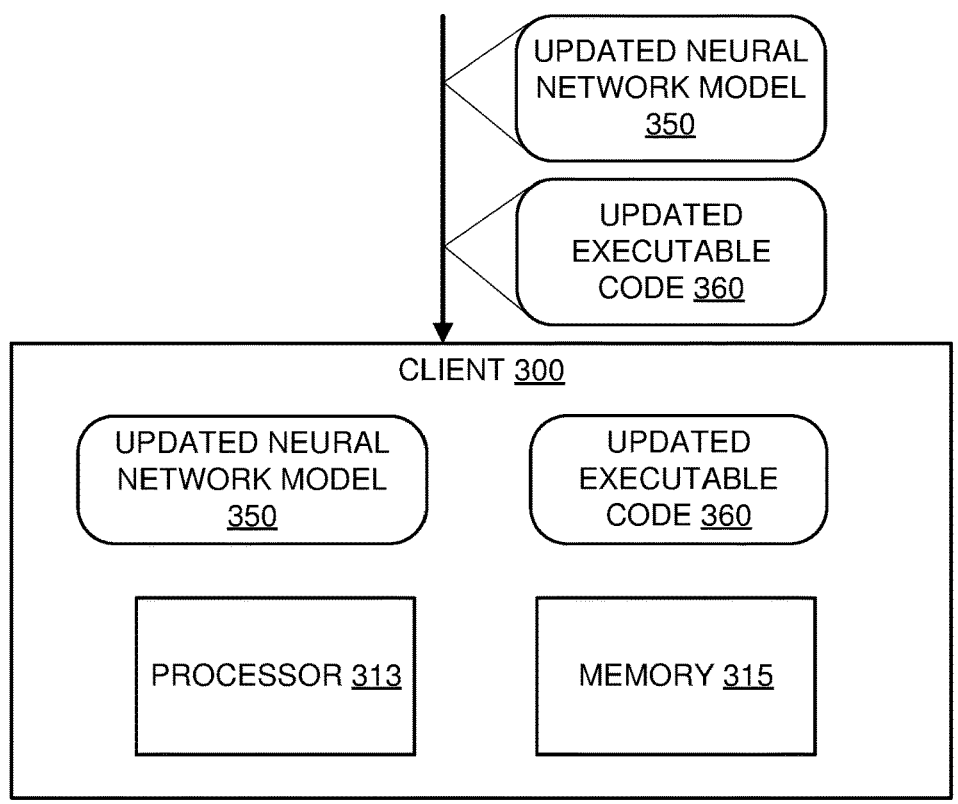

FIGS. 3A-B are diagrams depicting an example client computing device 300 configured to receive a neural network model and code and generate feedback data. The example client computing device 310 comprises a processor 313 and a memory 315. The memory 315 can store instructions that, when executed by the processor 313, configure the client computing device 300 to perform operations for generating predictions using neural network models and generating feedback data.

The client computing device 300 can be configured to receive a neural network model and executable code. In FIG. 3A, the client computing device 300 is depicted as receiving a neural network model 320 and executable code 330. The neural network model 320 and the executable code 330 can be received from a server computer connected to the client computing device 300. For example, the neural network model 320 and executable code 330 can be received via one or more wireless and/or wired connections. In at least some embodiments, the neural network model 320 and the executable code 330 are received via a computer network.

The client computing device 300 can be configured to store the neural network model 320 and the executable code 330. For example, the neural network model 320 and the executable code 330 can be stored in the memory 315. Additionally or alternatively, the neural network model 320 and/or the executable code 330 can be stored in a storage device, such as a hard drive or the like (not shown).

The client computing device 300 is configured to execute the executable code 330 to generate a prediction using the neural network model 320. For example, the executable code 330 can include instructions that, when executed by the processor 313, configure the client computing device 300 to process one or more input values using the neural network model 320 and to retrieve one or more output values from one or more output nodes of the neural network model 320. The client computing device 300 can be configured to generate feedback data 340 based on an accuracy of the generated prediction. For example, the client computing device 300 can be configured to present the prediction via a user interface (not shown) of the client computing device 300 and to receive input via the user interface indicating whether or not the prediction is correct. The client computing device 300 can generate feedback data based, at least in part, on the input indicating whether or not the prediction is correct. In at least one embodiment, the feedback data comprises the one or more input values processed using the neural network model 320, the one or more output values retrieved from the one or more output nodes of the neural network model 320, and a value indicating whether or not the prediction (based on the one or more output values) is/are correct.

In at least some embodiments, the client computing device 300 can be configured to generate multiple predictions using the neural network model 320. The client computing device 300 can receive multiple inputs via the user interface of the client computing device 300, indicating whether or not the multiple predictions are correct. The client computing device 300 can generate the feedback data 340 based on the multiple received inputs. For example, the client computing device 300 can be configured to perform multiple predictions (for example by executing the executable code 330 multiple times using multiple inputs) and to generate the feedback data 340 comprising the multiple predictions, their associated input values, and their associated output values. In at least some such embodiments, the feedback data can be stored in the memory 315 and/or one or more storage devices (not shown) connected to the client computing device 300.

The client computing device 300 is configured to transmit the feedback data 340 to one or more server computers (not shown). The feedback data 340 can be transmitted via one or more wired and/or wireless connections and/or a computer network. In at least some embodiments, the feedback data 340 can be transmitted periodically. For example, feedback data for predictions generated using the executable code 330 and the neural network model 320 can be stored locally on the client computing device 300 and transmitted periodically in batches to one or more server computers. Additionally or alternatively, the client computing device 300 can be configured to transmit feedback data pertaining to predictions as they are generated.

The client computing device 300 can be configured to receive an updated neural network model based on feedback data and updated executable code subsequent to transmitting the feedback data to one or more server computers. In FIG.

3B, the client computing device 300 is depicted as receiving an updated neutral network model 350 and updated executable code 360. The updated neural network model 350 and the updated executable code 360 can be received from a server computer, such as a server computer to which the feedback data 340 was transmitted. The updated neural network model 350 can be an updated version of the neural network model 320 that has been trained using the feedback data 340. The executable code 360 can include instructions that, when executed by the processor 313, configure the client computing device 300 to generate a prediction using the updated neural network model 350. Subsequent to receiving the updated neural network model 350 and the updated executable code 360, the client computing device 300 can execute the updated executable code 360 to generate an updated prediction using the updated neural network model 350.

Figure 4:
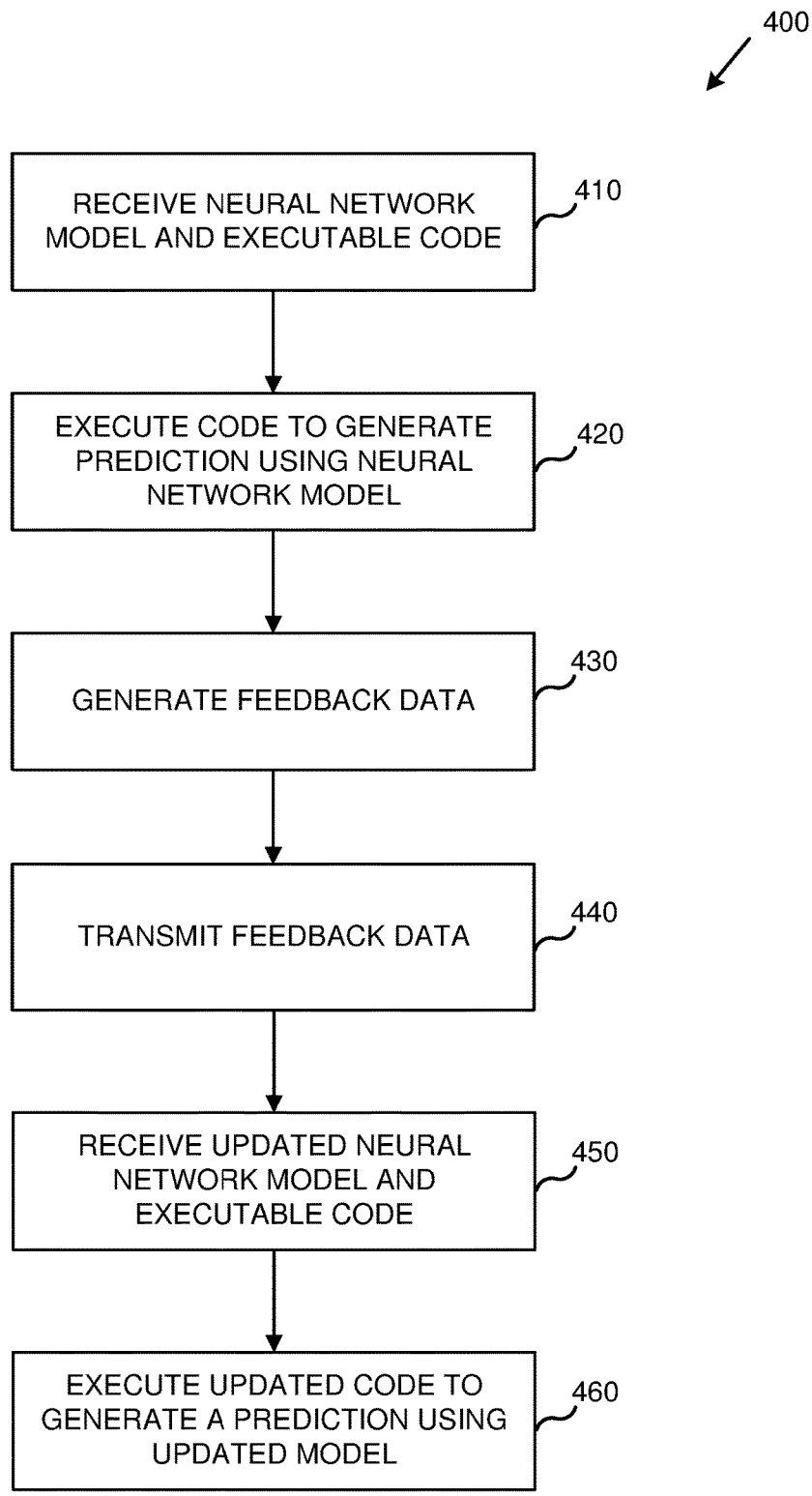
FIG. 4 is a flowchart of an example method for using a neural network model and generating feedback data.

FIG. 4 is a flowchart of an example method 400 for using a neural network model and generating feedback data. Any of the example systems described herein can be used to perform the example method 400. For example, the example client computing device 300 can be used to perform all or part of the example method 400.

At 410, a neural network model and associated executable code are received. For example, referring to FIG. 3A, the neural network model 320 and the executable code 330 can be received by the client computing device 300 from a server computer. The neural network model and associated executable code can be received via one or more wired and/or wireless connections and/or via a computer network.

At 420, the executable code is executed to generate a prediction using the neural network model. For example, referring to FIG. 3A, the executable code 330 can be executed by one or more processors (such as processor 313) of the client computing device 300 to generate a prediction using the neural network model 320. For example, executing the code can comprise executing instructions to process one or more input values using the neural network model and/or to retrieve one or more output values from one or more output nodes of the neural network model.

At 430, feedback data for the prediction is generated. For example, referring to FIG. 3A, the feedback data 340 can be generated by the client computing device 300. In at least some embodiments, the prediction generated using the neural network model is presented to a user via a user interface. Input can be received from the user via the same or a different user interface, indicating whether or not the generated prediction is accurate. The generated feedback data can include a value indicating whether or not the generated prediction was accurate, and any input values that were provided to the neural network model and/or any output values that make up the generated prediction.

At 440, the feedback data is transmitted. For example, referring to FIG. 3A, the feedback data 340 can be transmitted by the client computing device 300 to one or more server computers. At 450, an updated neural network model and updated executable code are received. For example, the updated neural network model 350 and the updated executable code 360 can be received by the client computing device 300 from a server computer. The updated neural network model 350 can represent an updated version of the previous neural network model based on the feedback data that was transmitted to the server computer at 440.

At 460, the updated executable code is executed to generate a prediction using the updated neural network model. For example, referring to FIG. 3B, the client computing device 300 can execute the updated executable code 360 to generate a prediction using the updated neural network model 350. In at least some embodiments, the previous neural network model and/or the previous executable code is/are deleted. For example, the previous neural network model and the previous executable code can be overwritten by the updated neural network model and the updated executable code.

In at least some embodiments, the neural network models received at a client computing device are read-only models. For example, the client computing device can be prevented from updating a received neural network model locally. In some such embodiments, the executable code can contain instructions that ensure that the associated neural network model is not modified. For example, the neural network model can include a checksum (such as a hash value) that was generated based on the state of the neural network model when it was transmitted to the client computing device. The executable code can include instructions that generate a new checksum based on the state of the neural network model as it exists on the client computing device. The executable code can include instructions that will only use the neural network model to generate a prediction if the checksums match. In at least some such embodiments, the executable code can include instructions that cause the client computing device to re-download the neural network model if the checksums do not match. Additionally or alternatively, the executable code can be generated without instructions for updating or otherwise modifying the associated neural network model.

EXAMPLE 4

Example Systems for Generating Multiple Neural Network Model Versions

In any of the examples described herein, a computing device can be provided for generating multiple versions of a neural network model.

Figure 5:
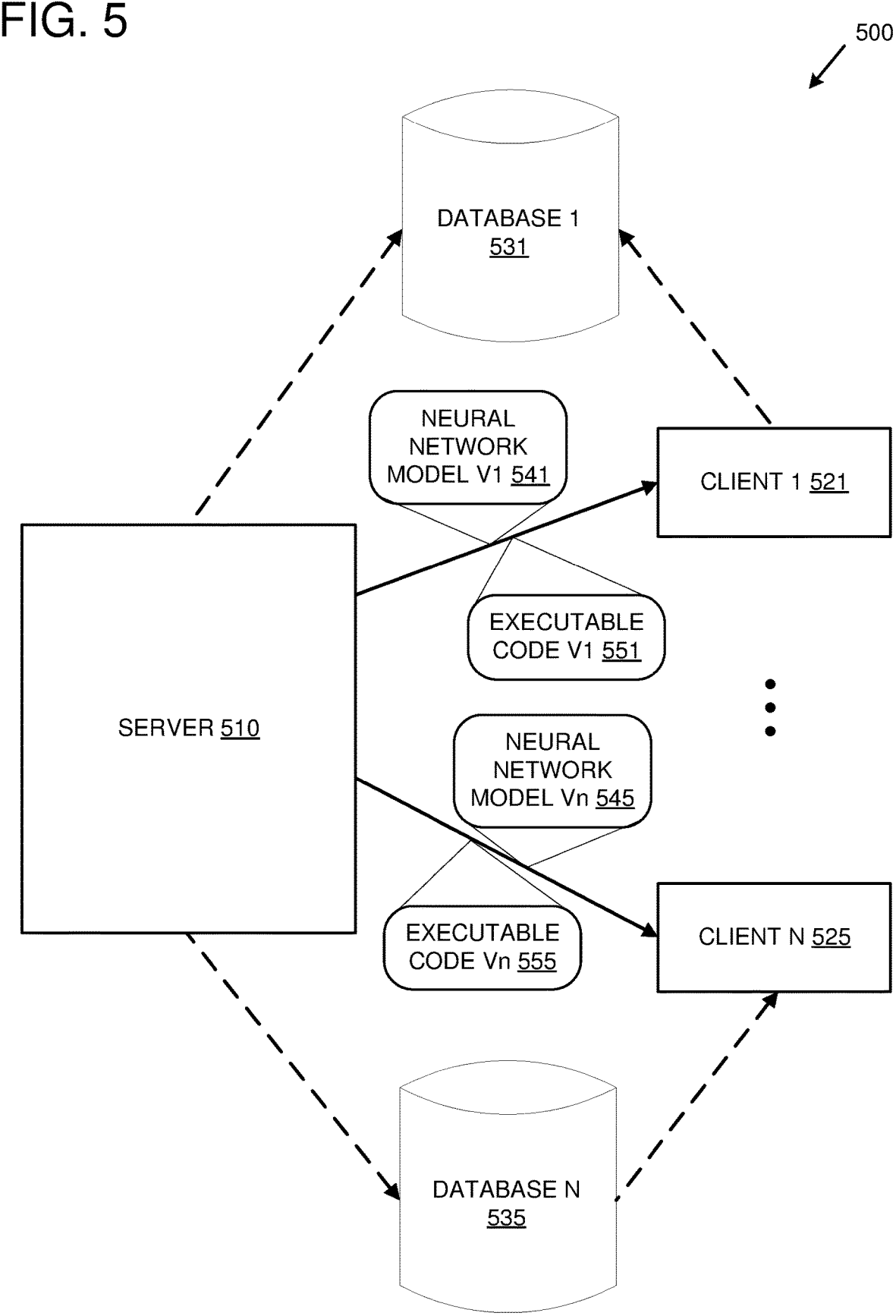
FIG. 5 is a system diagram depicting an example system comprising a server and a plurality of clients.

FIG. 5 is a system diagram depicting an example system 500 comprising a server computer 510 and a plurality of client computing devices 521-525. Although two client computing devices are depicted in FIG. 5, other numbers of client computing devices are possible. The server computer 510 is configured to transmit versions of a neural network model (e.g., 541-545) to the plurality of client computing devices 521-525, along with associated executable code (e.g., 551-555). For example, the server computer 510 can transmit a first version of the neural network model 541 and associated executable code 551 to the client computing device 521. The server computer 510 can transmit a second version of the neural network model 545 and associated executable code 555 to the client computing device 525.

In at least some embodiments, the server computer 510 can receive feedback data (not shown) from the plurality of client computing devices 521-525 and can generate updated versions of the neural network model based on the received feedback data. The updated versions of the neural network model can then be transmitted to the plurality of client computing devices. For example, in one scenario the server computer 510 can receive feedback data from the client computing device 521, wherein the feedback data comprises an indication of an accuracy of a prediction generated by the client computing device 521 using the neural network model 541. The server computer 510 can receive additional feedback data from the client computing device 525, wherein the additional feedback data comprises an indication of an accuracy of another prediction generated by the client computing device 525 using the neural network model 545. The server computer 510 can then generate an updated neural network model and updated executable code based on the feedback data received from the client computing device 521 and the additional feedback data received from the client computing device 525.

In at least some embodiments, generating the executable code comprises generating a first version of the executable code (e.g., 551) for a first client computing device (e.g., 521) and generating a second version of the executable code (e.g., 555) for the second client computing device (e.g., 525). For example, the server computer 510 can generate one version of the executable code (e.g., 551) and transmit it to the client computing device 521 and can generate a different version of the executable code (e.g., 555) and to transmit it to the client computing device 525.

Different versions of the executable code can include different instructions that cause different client computing devices to interact with the neural network model in different ways. In at least some embodiments, the client computing devices 521-525 are associated with different databases (e.g., 531 and 535). For example, a given database (e.g., 531 or 535) can contain data for a given client that is associated with a given client computing device (e.g., 521 or 525). A given client computing device can be associated with a client identifier (such as a unique alphabetic identifier, numerical identifier, and/or alpha the numerical identifier) and a given database can be associated with the same client identifier. In such a scenario, the server computer 510 can determine that the given client computing device is associated with the given database. The server computer 510 can be configured to generate a version of the executable code that comprises instructions that cause the given client computing device to access the given database when using the neural network model. For example, the executable code version 551 can contain instructions that cause the client computing device 521 to access the database 531 when using the neural network model 541. For example, the executable code version 555 can contain instructions that cause the client computing device 525 to access the database 535 when using the neural network model 545. Example database access can include retrieving input values to be applied to the neural network model, storing predictions generated using the neural network model, and/or storing feedback data generated based on predictions generated using the neural network model.

In a different or further embodiment, the server computer 510 can be configured to generate a neural network model using a database. For example, the server computer 510 can determine that the database 531 is associated with a client identifier that is also associated with the client computing device 521. The server computer 510 can retrieve training data from the database 531 and use the retrieved training data to generate a version of the neural network model (e.g., 541) associated with the client identifier. The server computer 510 can then transmit the generated version of the neural network model (e.g., 541) to the client computing device 521. In at least some embodiments, different versions of the neural network model can be generated using different databases associated with different client identifiers. For example, in an embodiment where the database 531 and the client computing device 521 are associated with a first client identifier and the client computing device 525 and the database 535 for associated with a second client identifier, the server computer 510 can generate a first version of the neural network model 541 using training data stored in the database 531 and can generate a second, different version of the neural network model 545 using different training data stored in the database 535. The server computer 510 can transmit the first version of the neural network model 541 to the client computing device 521 and can transmit the second version of the neural network model 545 to the client computing device 525.

EXAMPLE 5

Example Neural Network Models

In any of the examples described herein, a neural network model can be provided for generating predictions.

A neural network model comprises a plurality of artificial neurons (also referred to as perceptrons or nodes) that can be configured to receive input, combine the input with an internal state (sometimes referred to as activation), and produce an output. In at least some embodiments, a neuron can be associated with an activation threshold which limits an activation of a neuron to scenarios where a given activation value rises above (or falls below) the given threshold. Initial inputs for a neural network model can comprise one or more data values. Example inputs can include digital representations of images, documents, data arrays, etc. An ultimate output of a neural network model comprises one or more values that represent a prediction (such as classifying a document, recognizing an object in an image, forecasting a weather event, etc.). In at least some embodiments, an activation function can be provided which provides a smooth transition as input values change (e.g., a small change in input produces a small change in output).

The neural network model comprises edges (also referred to as connections). An edge connects two neurons and has a direction which identifies one of the neurons as an output neuron and the other neuron as an input neuron. If an activation function of the output neuron generates a value, the value is provided as an input value of the input neuron. An edge can be associated with a weight value that can represent a relative importance of the edge. In such an embodiment, the output value of the output neuron can be modified using the weight value before it is provided to the input neuron. A given neuron can have multiple input and/or output edges.

In at least some neural network models, neurons are organized into multiple layers. Neurons of one layer can connect to neurons of an immediately preceding layer or an immediately following layer. The layer that receives external data as input values can be referred to as an input layer. A layer that produces an ultimate result can be referred to as an output layer. Zero or more layers of neurons can exist between the input layer and the output layer. These layers can be referred to as hidden layers. However, single-layer and unlayered networks are also possible. Various connection patterns can be used to connect the neurons of one layer to neurons of another layer. For example, the neurons of two layers can be fully connected, meaning that every neuron in one layer has edges connecting it to every neuron in the next layer. In another example, connection pools can be used, in which a group of neurons in one layer all have edges connecting to a single neuron in the next layer. In such embodiments, the number of neurons in the next layer can be reduced, thereby concentrating outputs from a larger number of neurons in the preceding layer into a smaller number of neurons in the following layer. Neurons with such connections form a directed acyclic graph and can be referred to as feedforward networks. Alternatively, networks can allow edges between nodes in a same layer and/or from neurons in one layer back to neurons in a preceding layer. Such networks can be referred to as recurrent networks.

A neural network model can be trained by adapting the neural network model based on sample observations. Training can comprise adjusting weights of edges (and/or optional activation thresholds of neurons) to improve the accuracy of the predictions generated by the neural network model. This can be done by attempting to minimize observed errors. In at least some scenarios, training can be considered to be complete when examining additional observations does not usefully reduce an error rate of the neural network model. However, even after an initial training phase, learning can still continue if new predictions and associated accuracy values cause an error rate of the neural network model to fall below a given threshold.

As described herein, feedback data can be received from one or more client computing devices using a neural network model and associated executable code. If errors in the feedback data cause the error rate of the neural network model to fall below an acceptable threshold, a server computer can use the feedback data (and optionally all or part of the initial training data) to re-train the neural network model; thereby generating an updated neural network model. The updated neural network model, and associated updated code, can then be deployed to the one or more client computing devices. The one or more client computing devices can subsequently execute the updated code to make use of the updated neural network model for making predictions instead of the previous neural network model and the previous code.

Various modes of training are possible. In at least some embodiments, each input creates a weight (and/or activation threshold) adjustment to the neural network. For example, as client computing devices make predictions and generate feedback, the feedback data for the predictions can be streamed back to a server computer that continuously updates the neural network model. In such an embodiment, the server computer can be configured to periodically transmit an updated version of the model and associated updated code to the client computing devices. Such a learning mode can be referred to as a stochastic learning mode.

Alternatively, weights (and/or activation thresholds) can be based on a batch of inputs. For example, client computing devices can accumulate errors over a period of multiple predictions and can transmit the batch of accumulated errors to the server computer. Such a learning mode can be referred to as a batch learning mode. In at least some scenarios, stochastic learning modes can introduce noise. For example, by using a local gradient calculated from one data point, a chance that the neural network model will get stuck in a local minimum can be reduced. However, batch learning modes may yield a faster, more stable descent to a local minimum, since each update can be performed in a direction of the batch's average error. In at least some embodiments, a combination of both types of learning modes can be used.

Figure 6:
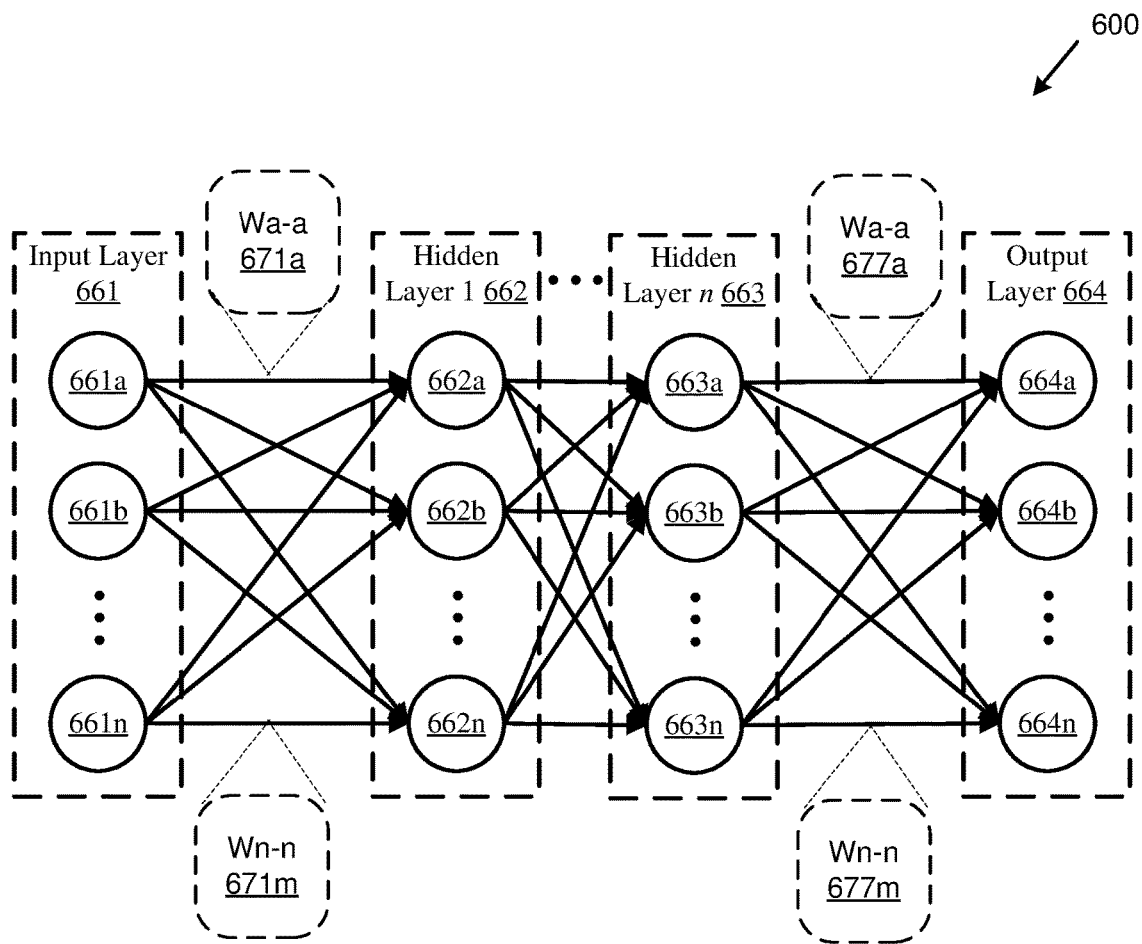
FIG. 6 is a diagram depicting an example neural network model.

FIG. 6 is a diagram depicting an example neural network model 600. The neural network model 600 can comprise a multilayer perceptron neural network. The neural network 600 may have an input layer 661, one or more hidden layers 662, 663, and an output layer 664. Each layer may have one or more nodes (or perceptrons). In at least some embodiments, the number of nodes at each layer is the same across the layers. Thus, the input layer 661 may have input nodes 661*a*, 661*b*, through 661*n*. Similarly, hidden layer 1 662 may have nodes 662*a*, 662*b*, though 662*n*, and so on through hidden layer n 663, which may have nodes 663*a*, 663*b*, through 663*n*. The output layer 664 may have nodes 664*a*, 664*b*, through 664*n*. However, layers with different numbers of nodes are also possible. A node may have one or more parameters, weights, coefficients, or other values, and one or more functions for the various inputs to that node.

The nodes of the neural network model 600 can be connected by edges with associated weights (e.g., 671*a*-671*m* and 677*a*-677*m*). For the sake of clarity, weights are not depicted for every edge depicted in FIG. 6. A weight can be used to modify an output value of a given node. The modified value can then be provided as input to another node. For example, an output of node 661*a* can be modified using weight 671*a* before the modified value is provided to node 662*a* as input.

The input layer 661 can accept an input vector to the neural network 600 and can begin neural network processing. (Although the neural network is referred to here as beginning the "processing," in at least some embodiments the neural network model 600 comprises a data structure representation of the neural network and associated executable code contains instructions for performing the processing of the input values through the neural network and producing the output values.) In some embodiments, the input layer 661 does not process the input vectors, other than any preprocessing necessary for the input vectors to be usable by the neural network model 600. In other embodiments, the input layer 661 may begin processing the input vectors using the functions and parameters at each node, similar to the hidden layers 662, 663.

The output of each layer can be the output of the various nodes at that layer. Further, nodes at a given layer can accept as input the output of one or more nodes at a preceding layer. For example, the output of input node 661*a* may be an input to one or more nodes in hidden layer 1 662, and so on for all the nodes in each successive layer. The output layer 664 may contain the final output values for the given input values in aggregate across its nodes 664*a*, 664*b*, through 664*n*. In this way, the neural network model 600 may be used to process input vectors through its various layers 661, 662, 663, 664, their respective nodes 661*a-n*, 662*a-n*, 663*a-n*, 664*a-n*, and their respective parameters and functions. In some embodiments, the layers 661, 662, 663, 664 may have varying numbers of nodes, while in other embodiments the layers may have the same number of nodes.

EXAMPLE 6

Example Executable Code

In any of the examples described herein, executable code can comprise instructions that can be executed by a computer processor. Example executable code includes instructions written in an imperative programming language (such as C, C++, C#, Java, JavaScript, assembly language, etc.) and/or instructions written in a declarative programming language (such as SQL, Acta Transformation Language (ATL), etc.). In at least some embodiments, the instructions can be compiled by a server and transmitted to a client computing device in an executable format. Additionally or alternatively, the instructions can be transmitted to the client as source code or in an intermediate representation (such as a bytecode). In such an embodiment, the instructions can be interpreted and/or compiled by the client computing device and then executed.

The executable code comprises instructions that, when executed by the client computing device, cause the client computing device to create one or more predictions using the associated neural network model. For example, the executable code can comprise instructions that cause the client computing device to retrieve input (for example from a data storage location and/or user input) and to apply the input to one or more input nodes of the neural network model. The executable instructions can include instructions to process one or more internal edges and nodes of the neural network model based on the applied input and/or to retrieve output values from one or more output nodes of the neural network model. In at least some embodiments, the executable code comprises instructions for creating an in-memory representation of a neural network based on the neural network model associated with the executable code.

In a different or further embodiment, the executable code comprises instructions determine the accuracy of the one or more output values of the neural network (the prediction(s) of the neural network). For example, the executable code can comprise instructions to receive input via one or more user interfaces of the client computing device indicating whether the output is accurate for the given input. The executable code can comprise instructions that store the prediction, the accuracy of the prediction, and/or the associated input value(s) as feedback data. In at least some such embodiments, the executable code can comprise instructions to transmit the feedback data to a server.

EXAMPLE 7

Example Computing Systems

Figure 7:
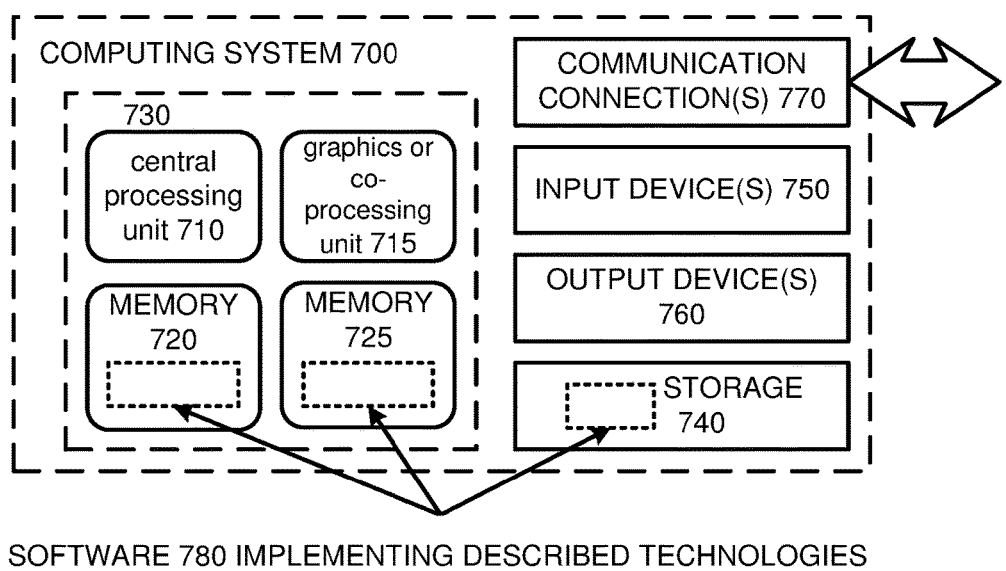
FIG. 7 is a block diagram of an example computing system in which some described embodiments can be implemented.

FIG. 7 depicts a generalized example of a suitable computing system 700 in which the described innovations may be implemented. For example, the computing system 700 can be used as a client computing device and/or server computer as described herein. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, solid state drives, etc.), or some combination of the two, accessible by the processing unit(s). The memory 720, 725 can store software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, solid state drives, CD-ROMs, DVDs, or any other medium which can be used to store information in a non-transitory way and which can be accessed within the computing system 700. The storage 740 can store instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 8

Example Cloud Computing Environment

Figure 8:
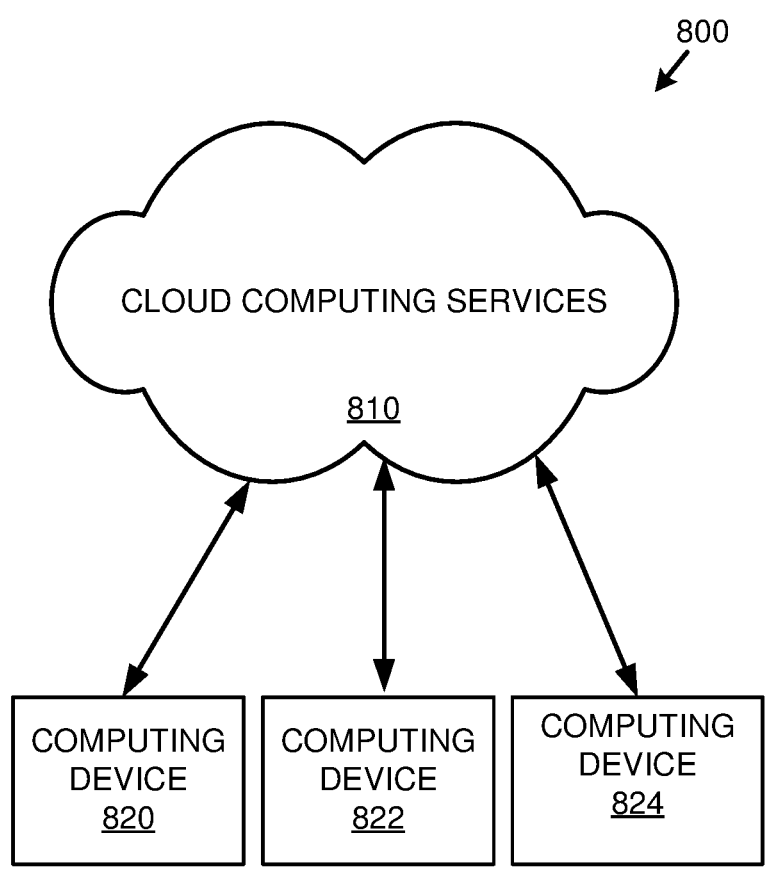
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. For example, one or more computer servers of the cloud computing services 810 can be used as a server computer as described herein. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like). One or more of the computing devices can be embedded devices that comprise integrated circuits (such as Internet of Things (IoT) devices, etc.).

EXAMPLE 9

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:
1. A method, comprising:
generating a neural network model by one or more server computers;
generating, by the one or more server computers, first executable code to access the neural network model, wherein the generated first executable code can be executed by a client computing device;
transmitting, by the one or more server computers, the neural network model and the generated first executable code to the client computing device, wherein the generated first executable code comprises instructions that cause the client computing device to retrieve input and apply the input to one or more input nodes of the neural network model and instructions that cause the client computing device to transmit feedback data to one or more server computers;
receiving, by the one or more server computers, the feedback data from the client computing device, wherein the feedback data is generated by the client computing device based on results produced using the neural network model and the generated first executable code;
generating, by the one or more server computers, an updated neural network model and updated executable code to access the updated neural network model based on the received feedback data; and
transmitting the updated neural network model and the updated executable code to the client computing device, wherein the client computing device overwrites the first executable code with the updated executable code.

2. The method of claim 1, wherein:
the neural network model and the generated first executable code are transmitted by the one or more server computers to multiple client computing devices;
the receiving feedback data comprises receiving separate feedback data from the multiple client computing devices; and
the generating the updated neural network model comprises updating the neural network model using the separate feedback data from the multiple client computing devices.

3. The method of claim 2, wherein the generating the generated first executable code comprises generating different versions of the generated first executable code for at least two of the multiple client computing devices.

4. The method of claim 3, wherein the generating different versions of the generated first executable code comprises:
identifying different data stores associated with the at least two of the multiple client computing devices;
generating different executable instructions to access the different data stores while using the neural network model; and
transmitting the different executable instructions to the at least two of the multiple client computing devices.

5. The method of claim 1, wherein the transmitting the neural network model and the generated first executable code to the client computing device comprises transmitting a read-only neural networking model.

6. The method of claim 5, wherein the transmitting a read-only neural network model comprises omitting instructions to update the neural network model from the generated first executable code transmitted to the client computing device.

7. The method of claim 1, wherein:
the client computing device is associated with a client identifier; and
the neural network model is generated using data retrieved from a database associated with the client identifier.

8. The method of claim 7, further comprising:
storing the feedback data received from the client computing device in the database associated with the client identifier.

9. A system, comprising:
a server computer comprising a processor and a memory storing instructions that, when executed by the processor, configure the server computer to perform operations, the operations comprising:
generating a neural network model;
generating first executable code that, when executed by a client computing device, causes the client computing device to generate a prediction using the neural network model;
transmitting the neural network model and the first executable code to the client computing device as part of a single transmission, wherein the generated first executable code comprises instructions that cause the client computing device to retrieve input and apply the input to one or more input nodes of the neural network model and instructions that cause the client computing device to transmit feedback data to one or more server computers;
receiving the feedback data from the client computing device, wherein the feedback data comprises an indication of an accuracy of the prediction generated by the client computing device using the neural network model;
generating an updated neural network model and updated executable code using the received feedback data; and
transmitting the updated neural network model and the updated executable code to the client computing device, wherein the client computing device overwrites the first executable code with the updated executable code.

10. The system of claim 9, wherein:
the client computing device is a first client computing device; and
the operations further comprise:
transmitting the neural network model and the first executable code to a second client computing device;
receiving additional feedback data from the second client computing device, wherein the additional feedback data comprises an indication of an accuracy of another prediction generated by the second client computing device using the neural network model; and
generating the updated neural network model and the updated executable code based on the feedback data and the additional feedback data.

11. The system of claim 10, wherein:
the generating the first executable code comprises generating a first version of the first executable code for the first client computing device and generating a second version of the first executable code for the second client computing device;
the transmitting the first executable code to the first client computing device comprises transmitting the first version of the first executable code to the firs first client computing device; and
the transmitting the first executable code to the second client computing device comprises transmitting the second version of the first executable code to the second client computing device.

12. The system of claim 11, wherein:
the first version of the first executable code comprises instructions that cause the first client computing device to access a first database when using the neural network model; and
the second version of the first executable code comprises instructions that cause the second client computing device to access a second database when using the neural network model.

13. The system of claim 9, wherein the neural network model is transmitted to the client computing device in a read-only mode.

14. The system of claim 9, wherein:
the system further comprises a database associated with a client identifier;
the client computing device is associated with the client identifier; and
the generating the neural network model comprises:
retrieving training data from the database associated with the client identifier, and
using the training data to generate a version of the neural network model associated with the client identifier.

15. The system of claim 14, wherein:
the client computing device is a first client computing device;
the database is a first database;
the client identifier is a first client identifier;
the system further comprises a second client computing device associated with a second client identifier;

the generating the neural network model further comprises:
retrieving additional training data from a second database associated with the second client identifier, and
using the additional training data to generate another version of the neural network model associated with the second client identifier; and
the operations further comprise transmitting the another version of the neural network model and another updated executable code to the second client computing device.

16. The system of claim 9, wherein:
the operations further comprise determining that the client computing device is an embedded device comprising an integrated circuit; and
the generating the first executable code comprises generating instructions that can be executed by the integrated circuit to generate the prediction using the neural network model.

17. The system of claim 9, further comprising a cloud computing environment comprising the server computer.

18. A computing device comprising a processor and a memory storing instructions that, when executed by the processor, configure the computing device to perform operations, the operations comprising:
receiving a neural network model and first executable code from a server computer;
executing the first executable code to generate a prediction using the neural network model;
generating feedback data based on an accuracy of the generated prediction;
transmitting the feedback data to the server computer;
receiving updated neural network model based on the feedback data;
receiving updated executable code from the server computer; and
executing the updated executable code to generate an updated prediction using the updated neural network model;
wherein the operations further comprise:
receiving, from the server computer, a received checksum generated based on the neural network model;
receiving, from the server computer, checksum executable code that calculates a generated checksum based on the neural network model received at the computing device;
executing the checksum executable code to calculate the generated checksum based on the neural network model received at the computing device; and
requesting retransmission of the neural network model by the computing device when the received checksum does not match the generated checksum, whereby a read only constraint on the neural network model is enforced.

19. The computing device of claim 18, wherein:
the operations further comprise:
presenting the prediction via a user interface of the computing device,
receiving input via the user interface indicating that the prediction is incorrect; and
the generating the feedback data is based, at least in part, on the input indicating that the prediction is incorrect.

20. The computing device of claim 19, wherein the operations further comprise:
generating multiple predictions, including the generated prediction, using the neural network model;
receiving multiple inputs via the user interface indicating whether the multiple predictions are correct; and
generating the feedback data based on the multiple inputs.

* * * * *